US012689219B2

(12) United States Patent
Kamata

(10) Patent No.: US 12,689,219 B2
(45) Date of Patent: Jul. 21, 2026

(54) PHOTOVOLTAIC GENERATION SITE CONSTRUCTION METHOD

(71) Applicants: CLEAN ENERGY FACTORY CO., LTD., Nemuro (JP); MERS FORS CO., LTD., Tokyo (JP)

(72) Inventor: Hiroyuki Kamata, Tokyo (JP)

(73) Assignees: CLEAN ENERGY FACTORY CO., LTD., Nemuro (JP); MERS FORS CO., LTD., Tokyo (JP)

( * ) Notice: Subject to any disclaimer, the term of this patent is extended or adjusted under 35 U.S.C. 154(b) by 112 days.

(21) Appl. No.: 17/761,284

(22) PCT Filed: Sep. 15, 2020

(86) PCT No.: PCT/JP2020/034813
§ 371 (c)(1),
(2) Date: Mar. 17, 2022

(87) PCT Pub. No.: WO2021/054303
PCT Pub. Date: Mar. 25, 2021

(65) Prior Publication Data
US 2022/0376512 A1 Nov. 24, 2022

(30) Foreign Application Priority Data
Sep. 18, 2019 (JP) ................................. 2019-169566

(51) Int. Cl.
*H02J 3/38* (2006.01)
*G05F 1/67* (2006.01)
(Continued)

(52) U.S. Cl.
CPC ................ *H02J 3/381* (2013.01); *G05F 1/67* (2013.01); *H02S 10/00* (2013.01); *H02J 2101/25* (2026.01)

(58) Field of Classification Search
None
See application file for complete search history.

(56) References Cited

U.S. PATENT DOCUMENTS 6,111,188 A * 8/2000 Kurokami ............... H02S 40/36
136/244
2012/0080955 A1 4/2012 Fishman et al.
(Continued)

FOREIGN PATENT DOCUMENTS

CN 104253171 A 12/2014
JP H09-018046 A 1/1997
(Continued)

OTHER PUBLICATIONS

PCT/ISA/210, "International Search Report for PCT International Application No. PCT/JP2020/034813," Nov. 24, 2020.

*Primary Examiner* — Dustin Q Dam
(74) *Attorney, Agent, or Firm* — HAUPTMAN HAM, LLP

(57) ABSTRACT

To provide a solar power generation site construction method enabling a great improvement in power generation efficiency through effectively utilizing a space of a power generation site with an irregular planar shape. A solar module 7 is configured by arranging a plurality of solar cell groups, each including a plurality of solar cells. A plurality of types of unit modules are prepared including a one-unit module $7_{-1}$ including one solar module, a reference unit module $7_{-s}$ including a plurality (N) of solar modules serving as a construction standard, and n-unit modules $7_{-n}$ including an arbitrary number (n), which falls between 2 and N−1, of solar modules. The solar modules 7 are densely laid in an area with a two-dimensional shape in top view of a field 35 of a power generation site, by combining the plurality of types of unit modules $7_{-1}$, $7_{-S}$, $7_{-n}$.

8 Claims, 11 Drawing Sheets

(51) Int. Cl.
  _H02S 10/00_          (2014.01)
  _H02J 101/24_          (2026.01)

(56)                    References Cited

U.S. PATENT DOCUMENTS

2016/0087579  A1*    3/2016   Moslehi ............. H01L 31/1896
                                                              136/251
2019/0363200  A1*   11/2019   Höft ....................... H02S 40/36

FOREIGN PATENT DOCUMENTS

| | | |
|---|---|---|
| JP | H10-270739  A | 10/1998 |
| JP | 2006-012920  A | 1/2006 |
| JP | 2006-101581  A | 4/2006 |
| JP | 2006-278670  A | 10/2006 |
| JP | 2011-170836  A | 9/2011 |
| JP | 2013-541930  A | 11/2013 |
| JP | 2015-095146  A | 5/2015 |
| JP | 2019-022326  A | 2/2019 |

* cited by examiner

[Figure 1(a)]
[Figure 1(b)]
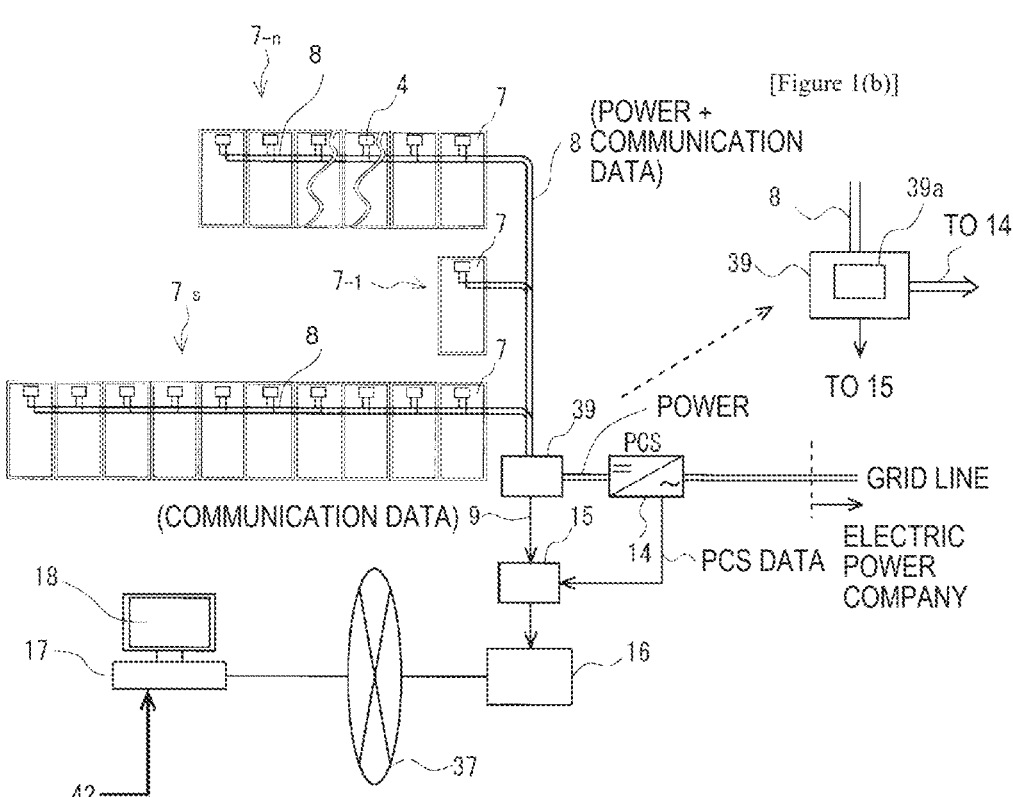

[Figure 2]
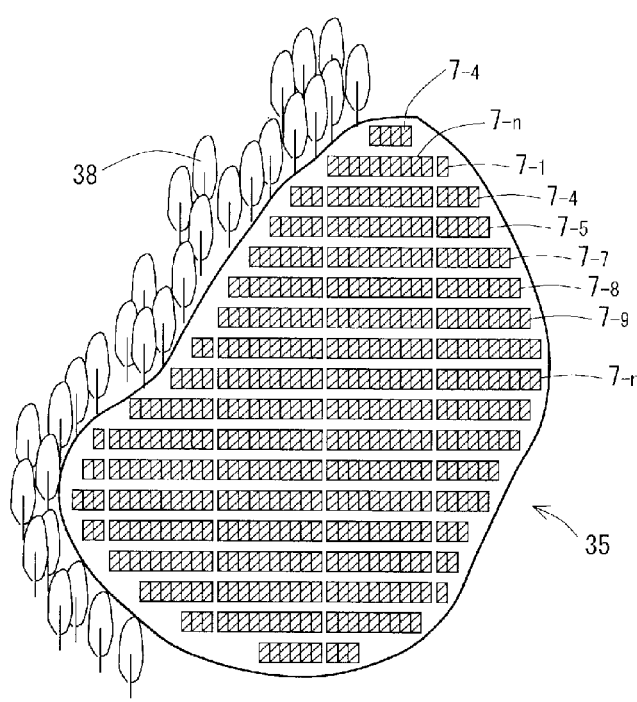
[Figure 3]
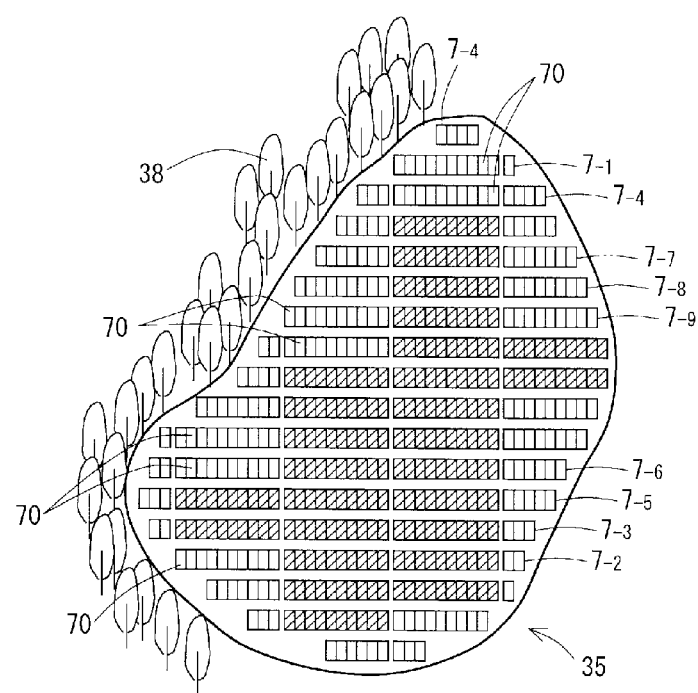

[Figure 4]
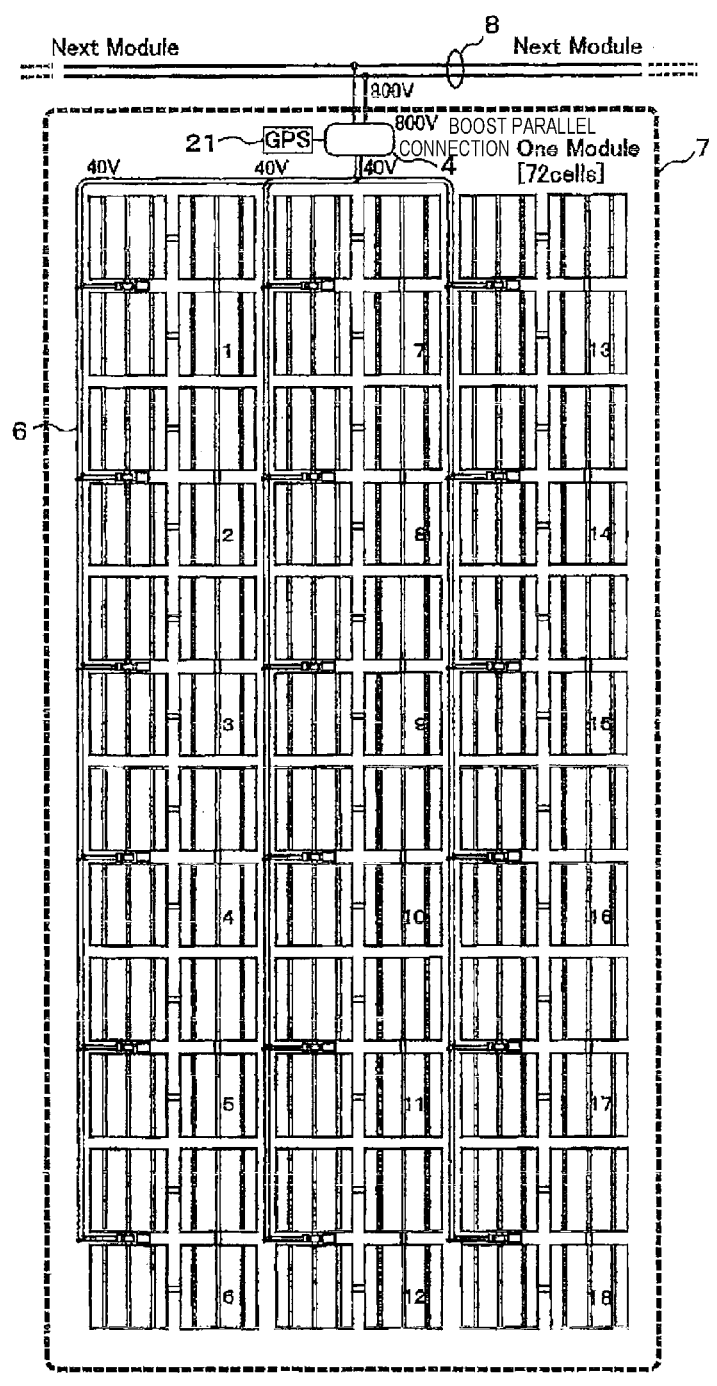

[Figure 5]
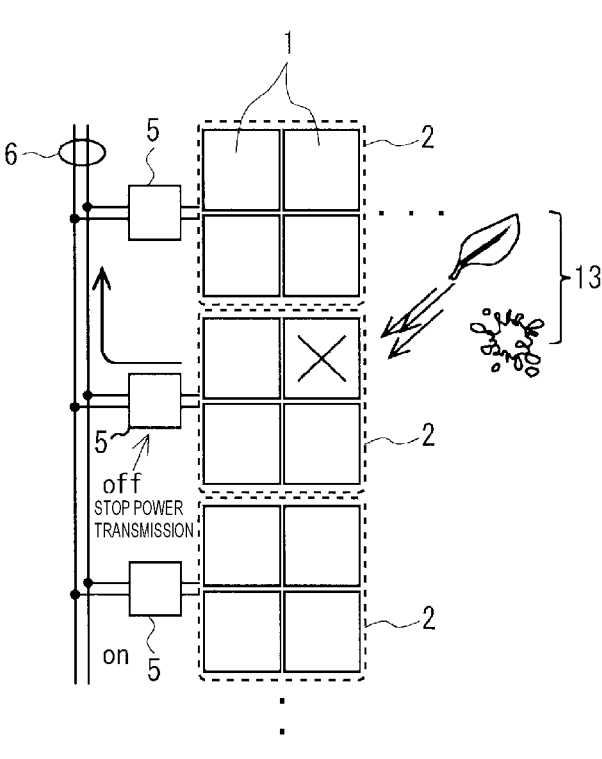

[Figure 6(a)]
[Figure 6(b)]
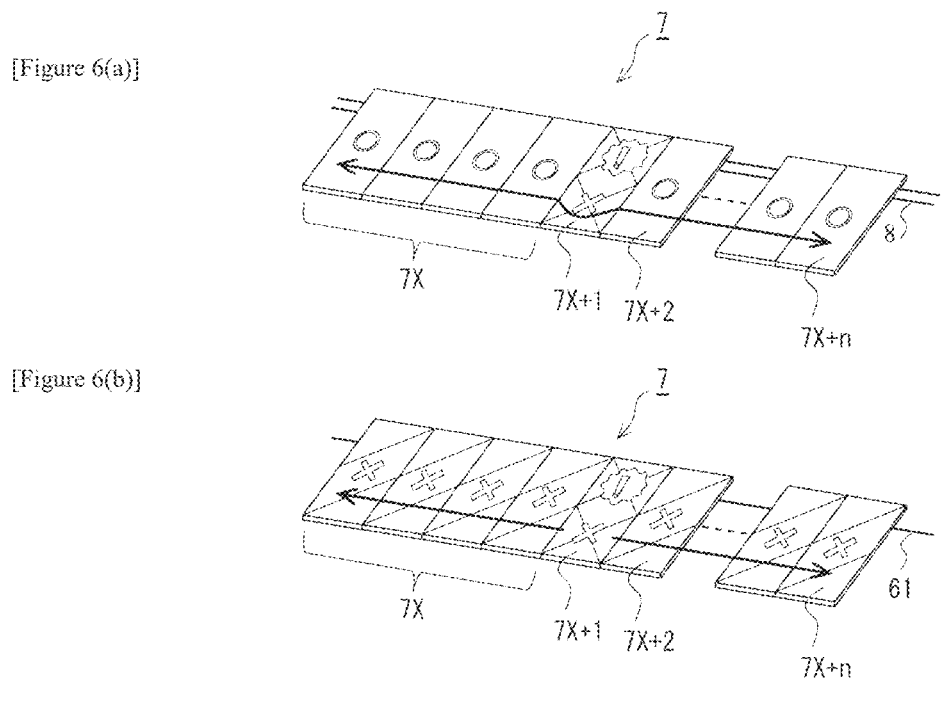
[Figure 7(a)]
[Figure 7(b)]
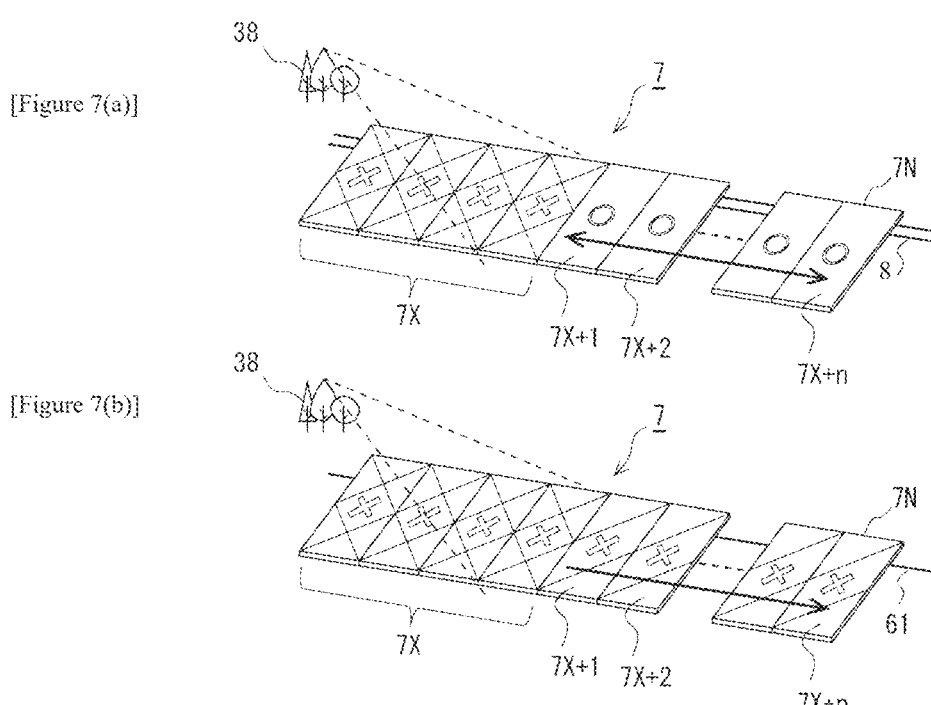

[Figure 8]
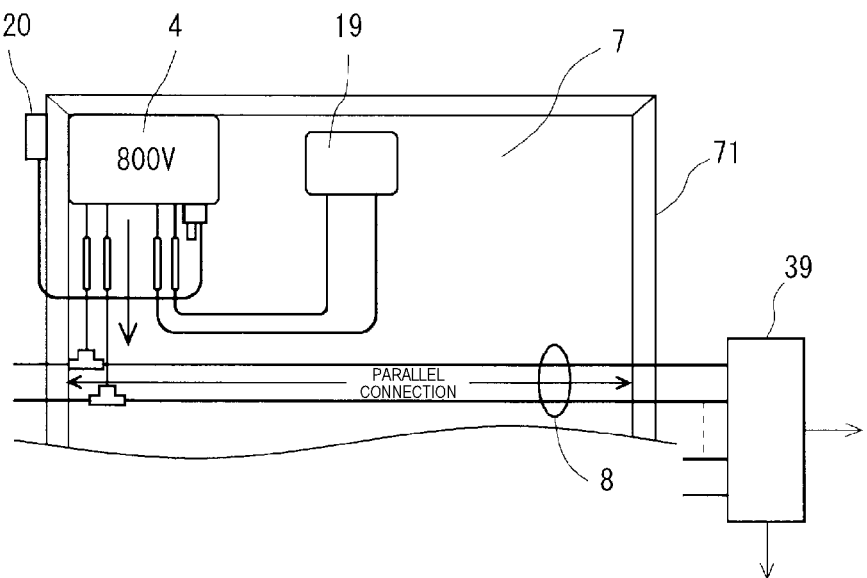
[Figure 9]
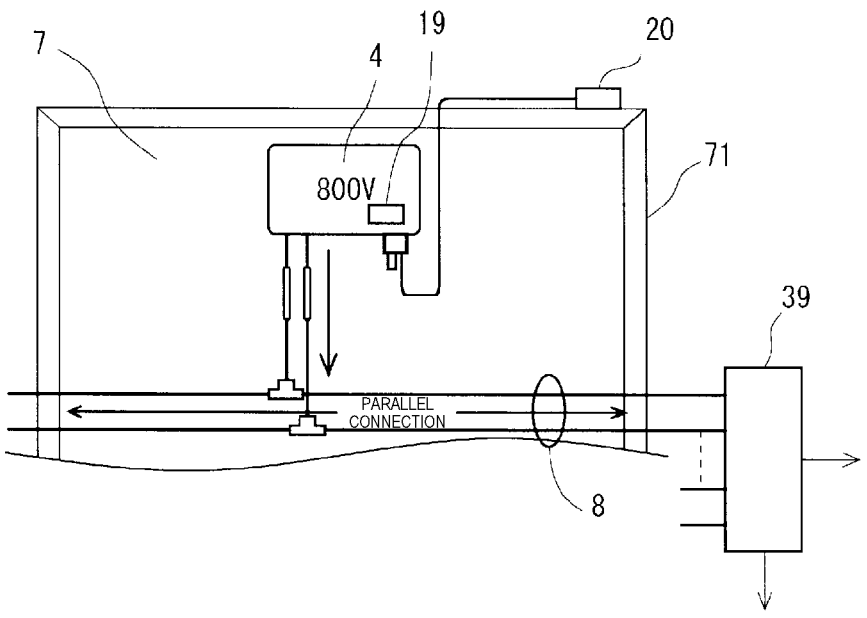

[Figure 10]
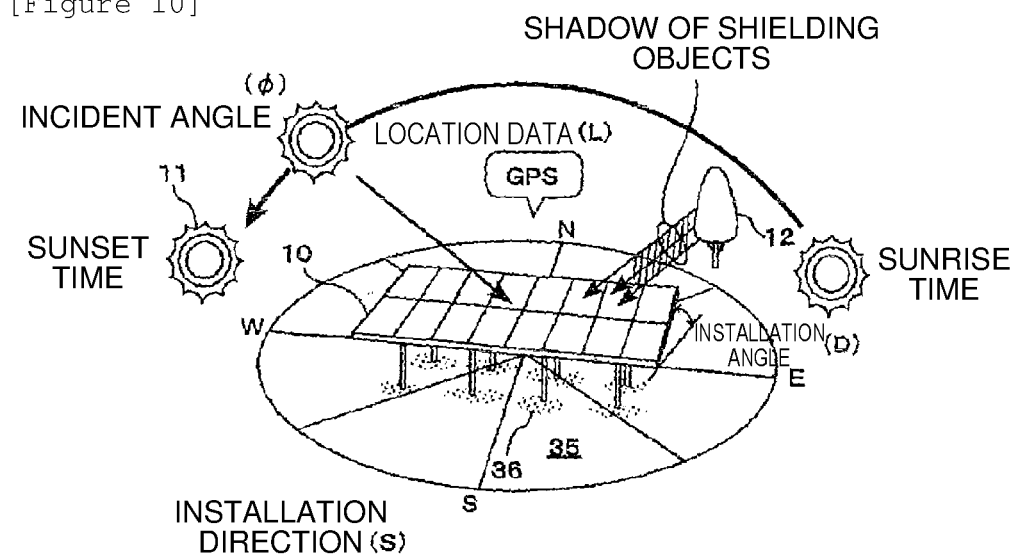

[Figure 11]
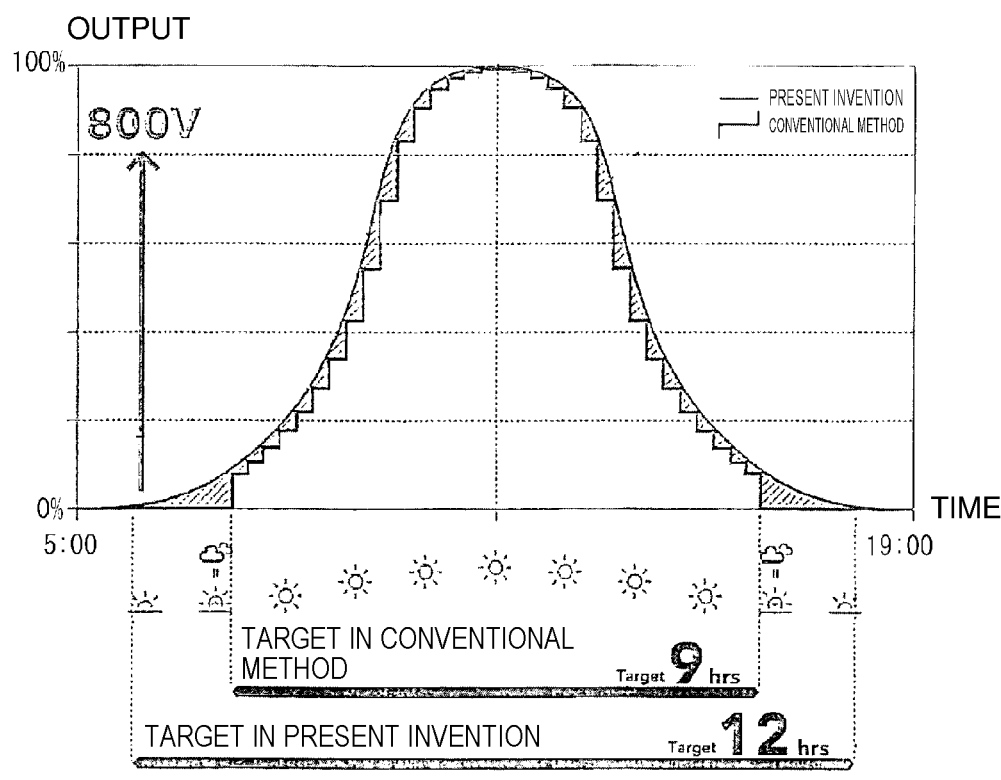

[Figure 12]
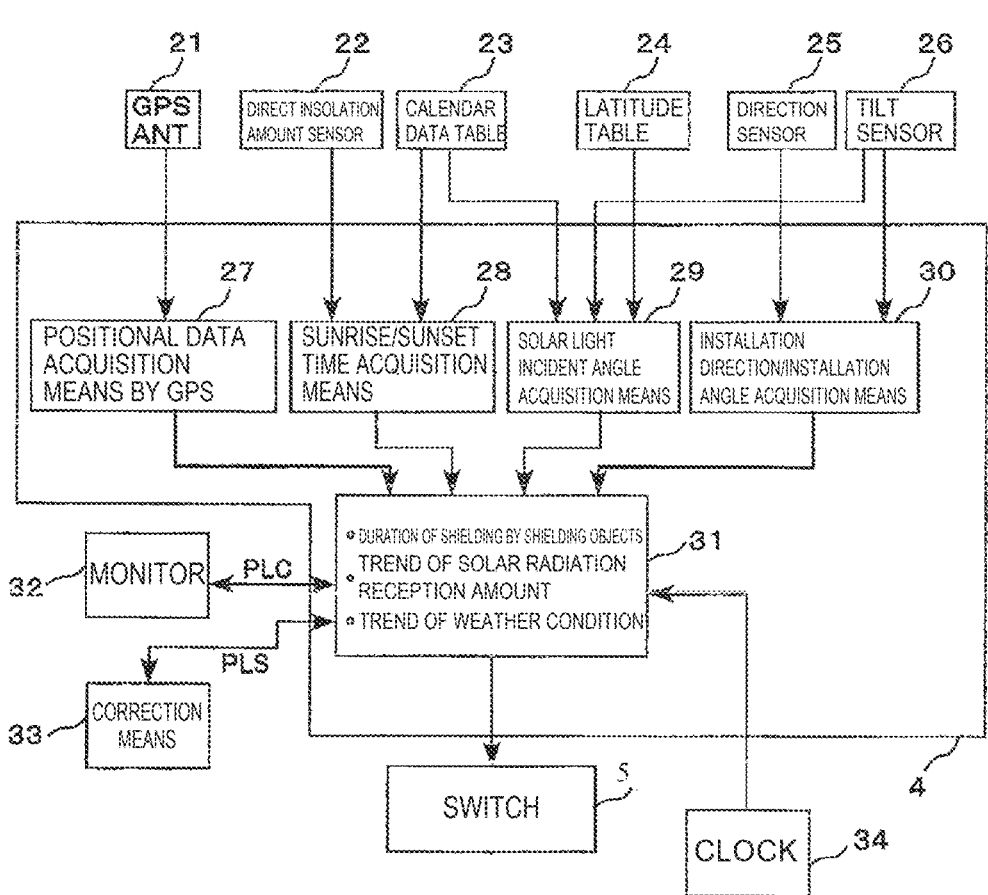

[Figure 13]
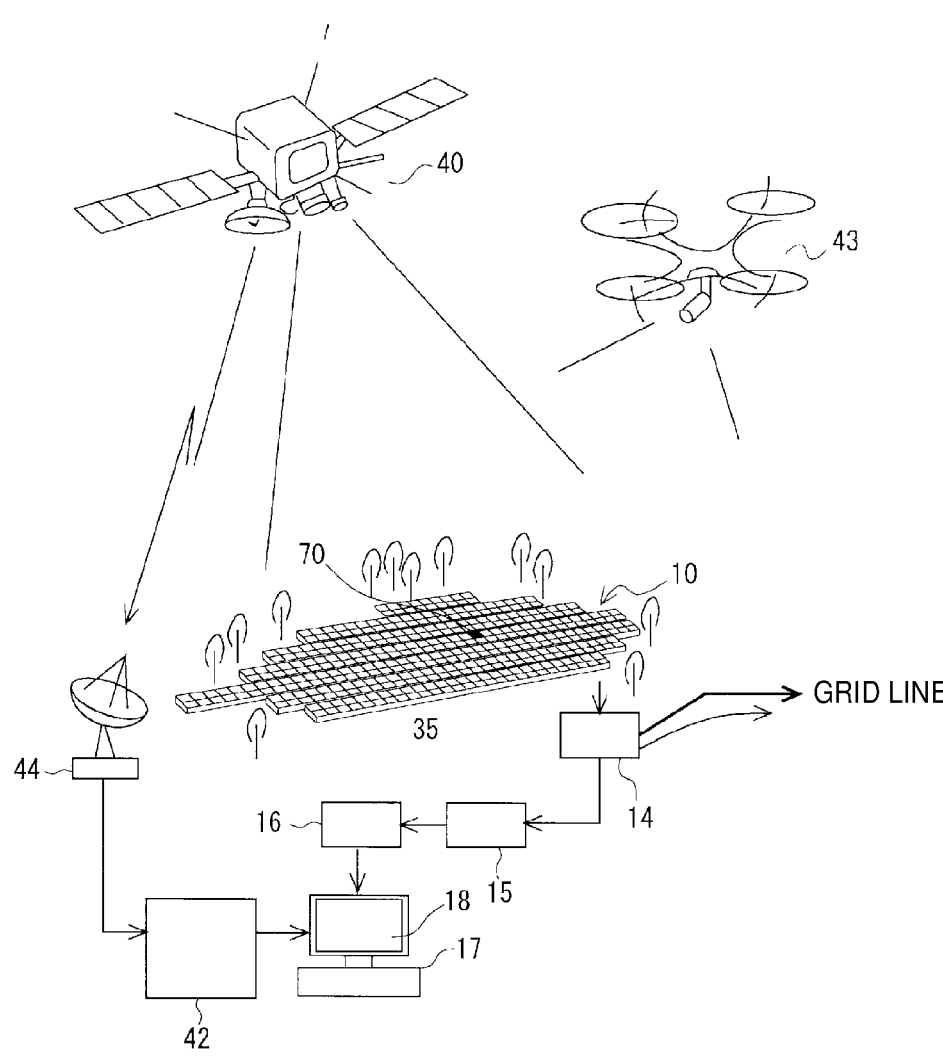

[Figure 14]
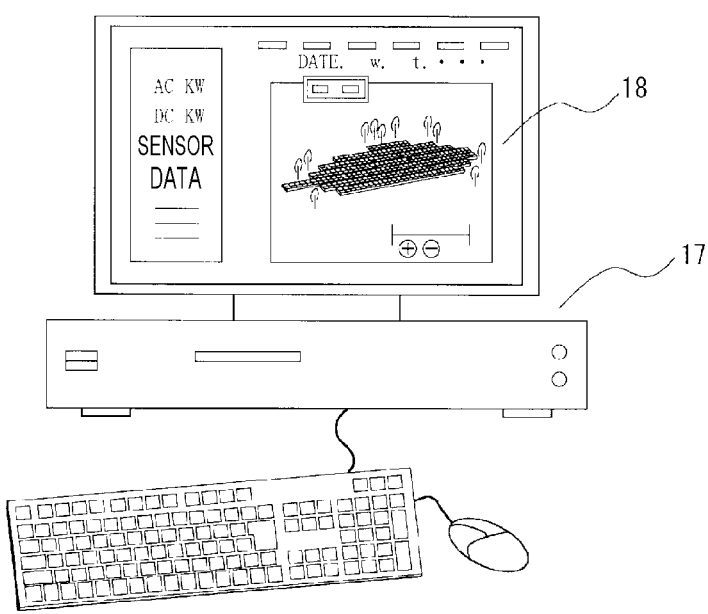

PHOTOVOLTAIC GENERATION SITE CONSTRUCTION METHOD

RELATED APPLICATIONS

The present application is National Phase of International Application No. PCT/JP2020/034813 filed Sep. 15, 2020, and claims priority from Japanese Application No. 2019-169566, filed Sep. 18, 2019, the disclosure of which is hereby incorporated by reference herein in its entirety.

TECHNICAL FIELD

The present invention relates to photovoltaic generation, and in particular to a solar power generation site construction method that enables effective utilization of a terrain in construction of a large-scale power generation site also referred to as a mega solar power plant.

BACKGROUND ART

As important means for decarbonization through leveraging renewable energy, various methods have been proposed, several of which have been put into practical applications as commercial facilities. Of these, solar power generation using solar light as an energy source and wind power generation using wind energy are prospective.

A large-scale solar power generation plant with more than 1,000 kW is also referred to as a mega solar power plant, and new installation of mega solar power plants is as active as wind power generation. Hereinafter, solar power generation is referred to as PV (Photo-Voltaic), a unit solar panel (element) used therefor is referred to as a PV cell (also referred to as a solar cell, or simply a cell), a group of one or a plurality of cells (e.g., four cells) is referred to as a solar cell group (also simply referred to as a cell group), a plurality of solar cell groups (e.g., ten or more groups) fixed on a frame and assembled as a construction standard is referred to as a solar module (also simply referred to as a module), and a large number of modules arranged in sequence in an area in the power generation site is referred to as a solar array.

Output of the PV cell varies according to an amount of received light. Particularly when the light level is low with a small amount of received light such as upon sunrise and sunset, output is low and internal impedance is high. Connecting a load when the internal impedance is high lowers voltage and inhibits normal operation as a power source, resulting in an unstable power source. Control enabling the stable operation even when the PV panel is in a low light level state is required. Such control is referred to as optimization, and optimizing means (circuit) is referred to as an optimizer.

Note that, in regard to this kind of prior art, Patent Literature 1, Patent Literature 2, Patent Literature 3, Patent Literature 4 and the like may be exemplified. Patent Literature 1, Patent Literature 2, and Patent Literature 3 disclose the prior arts related to the optimizing means, and Patent Literature 4 discloses a relationship between a solar panel and a received light amount.

CITATION LIST

Patent Literature

Patent Literature 1: Japanese Patent Laid-Open No. 2006-101581

Patent Literature 2: Japanese Patent Laid-Open No. 2011-170836
Patent Literature 3: Japanese Patent Laid-Open No. 2013-541930
Patent Literature 4: Japanese Patent Laid-Open No. 9-018046

SUMMARY OF INVENTION

Technical Problem

Not only power generation sites where a solar power plant referred to as a mega solar power plant is installed and built but also power generation sites with a certain scale of power generation are often installed in areas that have been developed from non-cultivated land such as a mountain area, idle farmland, or the like, namely an area on terrain with a light-shielding objects such as undulation and trees. In particular, installation in a mountain area often involves geography with a non-uniform solar light reception condition, or terrain surrounded by trees, and rarely involves flat land with no object shielding solar light. Also upon installation of a large number of solar modules on a roof or the like of a large factory or facility, it is required to consider environmental conditions similar to the above.

A top view shape of an area of the power generation site seen from above (planar shape of an installation surface of solar modules) is often indefinite. It is required to construct a power generation site that can efficiency utilize terrain by installing more solar modules on terrain of such an indefinite shape, and terrain or an installation surface (roof, wall surface, etc. of a building) with undulation, unevenness, or a slope.

In the existing power generation sites, in particular mega solar power plants, a defined plurality of modules grouped into one unit by a frame, a so-called "string", is installed on a cradle. The string is a construction unit in which a defined number (10 to 20) of modules are integrally fixed.

Therefore, in some areas of a power generation site, in particular an area with an indefinite planar shape, a section where the string would run over and cannot be installed is forced to be idle land (wasted space), particularly on indefinite shaped terrain such as a mountain area. Such idle land (wasted space) wastes solar energy.

An objective of the present invention is to provide a solar power generation site construction method enabling a great improvement in power generation efficiency on terrain of a fixed area, through effectively utilizing a space of a power generation site with an irregular planar shape.

Solution to Problem

In order to achieve the above-described objective, the present invention is a solar power generation site construction method for configuring a solar array (10) by densely laying solar modules (7) in a construction area (35) with an overlooking (top view) two-dimensional shape of a restricted-shaped power generation site, characterized by the following configuration.

Hereinafter, for the sake of understanding of the present invention, each constitutive element of the invention is denoted by a reference symbol of Example. It is to be noted that the present invention should not be limited to the configuration presented below.

(1) The present invention is characterized in that: a solar module (7) is configured by arranging a plurality of solar cell groups (2), each including a plurality of solar cells (1); a plurality of types of unit module sets are prepared including a one-unit module set (7₋₁) including one solar module, a standard unit module set (7₋S) including a plurality (N) of solar modules serving as a construction standard, and an n-unit module set (7₋n) including an arbitrary number (n), which falls between 2 and N−1, of solar modules; and the solar modules (7) are densely laid in the area (35) with a two-dimensional shape in top view of the field of the power generation site, by combining the plurality of types of unit module sets (7₋₁, 7₋S, 7₋n).

(2) The present invention is characterized in that: the standard unit module set (7₋S) is laid in a congested manner in a principal region in vicinity of a central portion of the area (35) with a two-dimensional shape in top view where a solar light reception condition is favorable and providing a space for laying the standard unit module set (7₋S); and the solar modules (7) are densely laid by combining the one-unit module set (7₋₁) and the n-unit module set (7₋n) in an empty space between an inner edge of the area (35) with a two-dimensional shape in top view and an outer edge of laying of the standard unit module set (7₋S).

(3) The present invention is characterized in that an installation angle of the solar module (7) installed in the field of the area (35) with a two-dimensional shape of the power generation site with respect to a horizontal plane is randomly set.

(4) The present invention is characterized in that the angle of the module included in the module set is randomly set within the module set.

(5) The present invention is characterized in that an installation angle of each of the solar modules (7) included in the standard module set (7₋S) and the n-module set (7₋n) installed in the field of the area (35) with a two-dimensional shape of the power generation site with respect to the horizontal plane is randomly set.

(6) The present invention is characterized in that an installation angle of the solar module (7) with respect to the horizontal plane is any one of a tilt angle of a reference plane oriented in a solar light radiation direction and a tilt angle of an arbitrary plane tilted with respect to the reference plane.

Note that the present invention is not limited to the above-described configuration and the configuration of Example described later, and it is obvious that various modifications can be made within the scope of the technical spirit of the present invention.

Advantageous Effects of Invention

In the conventional construction of a power generation site, since a fixed number of solar modules referred to as a string has been used as an installation unit in construction of a solar module, a section where the string runs over and solar modules cannot be installed has been idle land (space). In particular, in a field of indefinite shaped terrain such as a mountain area, leaving such idle land wastes solar energy.

According to the present invention, by using a module set including one or an arbitrary number of modules that can be laid in a space having been conventionally wasted due to impossibility of laying the standard module set (corresponding to the conventional string) in a field of indefinite shaped terrain, solar modules can be laid without wasting the space, enabling construction of a power generation site where utilization efficiency of the field of the power generation site is largely improved through dense laying of the solar modules.

As a result, construction of a power generation site effectively utilizing a space of a field of irregular terrain is enabled, and power generation efficiency on terrain of a fixed area is greatly improved.

In addition, an address of a module laid in the field is linked to a satellite image or a drone-captured image and/or a drawing, to enable identification of a module on a monitor in a monitoring site through, for example, detection of temperature change of the module. This enables prompt maintenance.

A terminal in the monitoring site is provided with a program that displays operation statuses of all modules in the power generation site to be managed in an appropriate display mode, to display on a monitor an operation history, a current status, a prediction and the like of a power generation amount of each module of the power generation site. This enables visual recognition of effective management of the power generation site and a prompt and accurate response. Notification of a specific module with a reduced power generation amount is made by, for example, displaying in red, blinking, or the like.

BRIEF DESCRIPTION OF DRAWINGS

FIGS. 1(*a*) and 1(*b*) are schematic views illustrating a configuration of solar modules constituting a power generation site and a management system according to the present invention.

FIG. 2 is an explanatory view of an example of terrain of the power generation site in which solar modules are laid, according to the present invention.

FIG. 3 is an explanatory view of a state in which the solar modules are laid by the conventional method in the example of terrain of the power generation site shown in FIG. 2.

FIG. 4 is a schematic view illustrating a configuration example of a solar module according to the present invention.

FIG. 5 is a schematic view illustrating solar cell groups constituting the solar module shown in FIG. 4.

FIGS. 6(*a*) and 6(*b*) are schematic views illustrating difference of decoupling methods of the solar modules constituting a solar array in a case of an in-module failure, through comparison between the present invention and the prior art.

FIGS. 7(*a*) and 7(*b*) are schematic views illustrating difference of decoupling methods of the solar modules constituting the solar array in a case of reduction in reception amount of solar light, through comparison between the present invention and the prior art.

FIG. 8 is a back view of a major part illustrating an attachment example of an optimizer in the solar module according to the present invention.

FIG. 9 is a back view of a major part illustrating another attachment example of the optimizer in the solar module according to the present invention.

FIG. 10 is an explanatory view of an example of solar light reception mode with respect to the solar modules.

FIG. 11 is a diagram illustrating change in output of the solar modules during a day through comparison between the present invention and the prior art.

FIG. 12 is a block diagram illustrating a configuration example with regard to the optimizer of the solar module according to the present invention.

FIG. 13 is a schematic view illustrating an entire image of an example of a monitoring system of the power generation site according to the present invention.

FIG. 14 is a schematic view illustrating an image of a monitoring monitor terminal in an example of the monitoring system of the power generation site according to the present invention.

DESCRIPTION OF EMBODIMENT

Hereinafter, an embodiment of the present invention is described in detail with reference to the drawings of Example.

EXAMPLE

FIGS. 1(*a*) and 1(*b*) are schematic views illustrating a configuration of solar modules constituting a power generation site and a management system according to the present invention, being an explanatory view of types of solar modules used for construction of the power generation site and a monitoring system. Note that, hereinafter, the term "solar" may be omitted and the solar module may be simply referred to as a "module", the solar cell may be simply referred to as a "cell", the solar module set may be simply referred to as a "module set", and the like. In addition, the terms "solar", "sun", and "solar light" may be used interchangeably.

FIGS. 1(*a*) and 1(*b*) show only three types of solar modules $7_{-1}$, $7_{-S}$, and $7_n$; however, $7_n$ includes $7_{-2}$ to $7_{-(S-1)}$. In addition, although the present Example assumes that S is 10 as a module number of construction standard and n is 2 to 9, n may also be S+1, S+2, . . . and the like.

In the drawings, reference numeral 7 denotes a single solar module (one module), reference numeral 4 denotes an optimizer, reference numeral 6 denotes an in-module parallel connection line (module generated power output conveyance communication line), reference numeral 8 denotes an inter-module parallel connection line (generated power output conveyance communication line of a plurality of modules).

Then, a monitoring/measurement/control signal of each module transmitted from the optimizer 4 is multiplexed as a multiplex signal on a power line via an PLC (power line communication) line using the inter-module parallel connection line 8, and is output with power. The generated power output lines 8 of a plurality of modules are concentrated in a junction box 39, and power is output to a system line and the signal is output to a relay terminal 15 respectively, by a power/data separator 39*a* installed in the junction box 39 that separates the power and the signal.

Reference numeral 9 denotes a signal path for transferring the monitoring/measurement/control signal from each module to the relay terminal 15 in the power generation site. In the present Example, transmission between the solar cell group, the solar module, and the junction box (39) is carried out via the PLC line, and communication between the junction box (39), the relay terminal (monitoring terminal in the site) 15 in the power generation site, and the monitoring site is carried out via a wired or wireless communication line 9.

A server 16 of the power generation site is transmitted to the remote terminal 17 via a public network such as Internet 37 and processed by various data processing programs installed on the remote terminal. A processing result is displayed on a monitor 18. Furthermore, the remote terminal 17 is configured to be capable of communicating with a power conditioner 14 via the relay terminal 15.

FIG. 2 is a plan view (top view two-dimensional shape) illustrating an example of a field (terrain of land and the like on which a cradle is to be installed) of the power generation site in which solar modules are laid, according to the present invention. FIG. 3 shows a state in which the solar modules are laid by the conventional method in the example of field terrain of the power generation site shown in FIG. 2. Reference numeral 35 in FIG. 2 shows the field of the power generation site. The field 35 has an indefinite shaped plan view, with shielding objects 38, represented by trees, being present in the circumference thereof.

In the present Example, the maximum number of the standard module sets 7-*n* are installed in a region in the vicinity of a central portion of the field 35 where a solar light reception condition is favorable. Installation using a so-called "string" including the conventional fixed number of modules shown in FIG. 3 (10 modules in this case similar to FIG. 2) results in a state shown by hatching in FIG. 3. The "string" is something like the module set of the present Example as a concept, but these are different in function. Non-hatched spaces indicate spaces where the "string" can be installed.

Note that an area in FIG. 3 where no string is installed in spite of a space corresponding to one string (non-hatched area) indicates a space (reference numeral 70) where installation of a string hardly contributes to efficiency of power generation as a whole due to the presence of the shielding objects 38 and the like suppressing a power generation amount. In addition, in the string configuration, the number of modules satisfying voltage required for power generation is defined, and an area not having enough space for installation of the number of modules is also included therein.

In other words, with the conventional string, due to the configuration of detaching a whole string when a power generation amount of even one single module constituting the string is no greater than a predetermined threshold, 26 strings with 260 modules in total are laid in FIG. 3 as a result.

On the other hand, in FIG. 2, since detachment from the module is possible in a unit of the module 7 constituting the module set according to the present Example or in a unit of the cell group 2 constituting the module 7 as described later in FIG. 5, the standard module set $7_n$ can be installed also in regions (seven regions) indicated by the spaces 70 in FIG. 3, for example. Note that, as described above, in the present Example, the cell group with a reduced power generation amount due to failure, an external factor, or an internal factor is ignored or left as is, and not necessarily meant to be electrically detached.

In addition, furthermore, for a space not large enough for installing the standard module set $7_n$, any of one-module set $7_{-1}$ to a nine-module set $7_{-9}$ is used according to the size of the space. The required number of these standard module set and the module sets smaller than the standard module set are prepared in advance on the basis of a construction drawing of the power generation site. Furthermore, an installation procedure for these module sets smaller than the standard module set is also mounted as a construction procedure in conveyance means and an installation crane, as a control program thereof.

The number of modules installed in the field of the power generation site according to the present Example shown in FIG. 2 is 477. To the contrary, in the power generation site in which the same number of modules constitute the string of the prior art in FIG. 3, the number of modules is 260 as mentioned above. By simply comparing these sites, the number of modules in the present Example is 1.83 times greater than the conventional number of modules. In other words, the construction method according to the present Example allows installation of almost twice as many modules as the conventional method. This means that a far greater power generation amount can be obtained from a field of a specific dimension.

FIG. 4 is a schematic view illustrating a configuration of Example of the solar module according to the present invention, in which four solar cells are assembled into a group, and one module 7 is constituted of eighteen groups, six rows by three columns, in total. FIG. 5 is an explanatory view of the cell groups constituting the module, in which each of the cell groups 2 is independent from each other and connected to the in-module parallel connection line 6 via a cell group controller 5. Then, the in-module parallel connection lines 6 from respective columns are concentrated in the optimizer 4. The optimizer 4 is connected in parallel to the inter-module parallel connection line 8.

The cell group controller 5 also having a connection/decoupling function monitors a power generation state of the cell 1 in the group, and when it is detected that a power generation amount is lower than a (preset) defined threshold value due to for example a physical failure or reduction in solar radiation reception amount caused by a solar light shielding object 13 such as a foreign object, decouples the group from the in-module parallel connection line 6 (off: ignored or left as is). Note that, when the shielding object such as a foreign object is removed and the solar radiation reception amount is restored and the power generation amount exceeds the threshold value, the cell group is connected again to the in-module parallel connection line 6 (on: contributing to power generation).

Furthermore, the optimizer 4 provided in the module 7 decouples the module 7 itself from the inter-module parallel connection line 8 (same as above) when an overall power generation amount of the module 7 is detected to be no greater than a threshold value due to, for example, breakage of a plurality of cell groups 2 or the shielding objects. The fact of decoupling of the module is transmitted as one of the monitoring/measurement/control signal 9 to the relay terminal (surveillance terminal of the site) 15 together with positional data from the GPS, and the data is transmitted to the server 16 and transferred to the remote terminal 17.

In the remote terminal 17, it is processed with image data from a data center (see reference numeral 42 in FIG. 13) described later, and identification of a failed module is displayed on the monitor 18 by an image or the like.

FIGS. 6(a) and 6(b) are diagrams illustrating difference of decoupling methods of the solar modules constituting the solar array in a case of an in-module failure, through comparison between the present invention and the prior art. FIG. 6(a) shows the module set of the present Example, in which when a specific module 7X+1 fails, only the module 7X+1 is decoupled (ignored or left as is) from the inter-module parallel connection line 8, and normal modules 7X, 7X+2, . . . 7X+n on both sides thereof continue power generation. In other words, in the present Example, the reduction in power generation amount is limited only to the failed module. When the module 7X+1 generates power somewhat beyond the threshold value, the generated power is effectively utilized.

On the other hand, in the conventional string shown in FIG. 6(b), all modules constituting the string are connected in series to an in-module serial connection line 61. Therefore, when a specific module 7X+1 fails, not only the module 7X+1, but also all modules 7X, 7X+2, . . . 7X+n on both sides thereof are (electrically) decoupled. In other words, a failure of only one module results in loss of power generation from an entire string to which the module belongs.

FIGS. 7(a) and 7(b) are schematic views illustrating difference of decoupling methods of the solar modules constituting the solar array in a case of reduction in reception amount of solar light, through comparison between the present invention and the prior art. FIG. 7(a) shows the module set of the present Example, in which when a plurality of modules 7X are shielded by the shielding objects 38 and the power generation amount is less than the predetermined threshold value, the plurality of modules 7X are decoupled (ignored or left as is) from the inter-module parallel connection line 8. As a result, the modules 7X+1, 7X+2, . . . 7X+n are capable of continuing power generation. In other words, in the present Example, power generation can be continued with modules other than the modules with the power generation amount less than the predetermined threshold value.

On the other hand, in the conventional string shown in FIG. 7(b), since all modules constituting the string are connected in series to the in-module serial connection line 61, even when only one module in the string is shielded by the shielding objects 38 and the power generation amount is less than the predetermined threshold value, the whole string is decoupled from the in-module serial connection line 61. In other words, reduction in power generation amount in only one module constituting the string results in loss of power generation from an entire string to which the module belongs.

FIG. 8 is a back view of a major part illustrating an example of a sensor interface in the solar module according to the present invention. In the module 7 according to the present Example, a plurality of cells are integrally fixed with a frame 71. The optimizer 4 is attached to a part of a back face of the frame 71. In addition, a sensor group 20 is installed in an appropriate position on the frame 71 of the module. The sensor group includes a tilt sensor, a direction sensor, an insolation amount sensor (illuminance sensor), a humidity sensor, a temperature sensor, an atmospheric pressure sensor, and a vibration sensor. The GPS also belongs to the sensor group. Output data from respective sensors is multiplexed in the optimizer 4, superposed on the inter-module connection line 8 and transmitted to the junction box 39, and transferred to the relay terminal 15 (FIGS. 1(a) and 1(b)).

The optimizer 4 boosts low-voltage power (for example, 40 V) taken from its own cell from the in-module parallel connection line 6 (see FIG. 4 mentioned above and the like) to high voltage (in this case, 800 V) for a conversion process in the power conditioner 14 (see FIGS. 1(a) and 1(b)), and feeds to the inter-module parallel connection line 8.

FIG. 9 is a back view of a major part illustrating another example of the optimizer in the solar module according to the present invention. In this configuration example, the terminal box 19 is accommodated in a housing of the optimizer 4 to simplify a back face structure of the frame 71 of the module. Note that the sensor group 20 may also be partially or entirely accommodated in the housing of the optimizer 4. This allows further simplification of structure of the module and can contribute to streamlining of construction.

FIG. 10 is an explanatory view of an example of a solar light reception mode of the solar modules, being a schematic view illustrating influence of a change in direct insolation amount and the shielding objects with respect to the solar array and an installation mode thereof. In FIG. 10, a solar array 10 is installed on a cradle 36 provided in the field of the power generation site 35. In FIG. 10, basically, the solar array 10 is installed with respect to the ground surface with an installation direction S and an installation angle D in the latitude direction. The field 35 is not necessarily planar and is typically irregular ground with irregularity and rolling, and illuminance of a sun-oriented face may vary between the solar array 10 and respective solar module sets ($7_{-1}$, $7_{-n}$, $7_{-S}$). Data of a position of the installation place (location data) L can be easily identified by the GPS. The position of each solar array 10, and each module 7 can also be identified.

In addition, a received light amount of solar radiation is also influenced by the shielding objects 12, the foreign object, and the like. For the solar array 10 or each of the solar module sets ($7_{-1}$, $7_{-n}$, $7_{-S}$), by randomly setting an angle of incidence φ to any of east, west, south, and north or a plurality of directions, the change in insolation amount due to movement of the sun with respect to the power generation amount can be alleviated. In addition, concentration of reflected light from the modules to a specific direction due to the uniform tilt angle of the modules can be avoided.

FIG. 11 is a diagram illustrating change in output of the solar modules during a day through comparison between the present invention and the prior art. As described above, by keeping the generated voltage of the solar cell group 2 (for example, 40 V in this case) constant, catch-up of output with illuminance of the sun becomes faster and more refined, enabling the optimal and greatest output even in unstable weather. Then, by boosting voltage to 800 V, for example, for each solar module, and feeding to the grid line, the optimal and greatest output can be obtained.

By maintaining the voltage constant, even when solar-generated power output (PV: photovoltaic power) of the solar module is low, for example in the morning and evening, on cloudy days, etc., fine control of power generation output in ascending and descending portions of an output characteristic curve is enabled as shown by the curve in FIG. 11, thus suppressing loss in the low-output state. As an example, supposing that the sun rises at 6:00 and the sun sets at 18:00, the duration during which the power generation output can be taken by the conventional method is 9 hours as shown in the stepped shape in the drawing. To the contrary, the duration is 12 hours with the solar module of the present Example.

FIG. 12 is a block diagram illustrating a configuration example with regard to the optimizer of the solar module according to the present invention. The configuration with regard to the optimizer 4 in the present Example is merely an example, and various modifications can be made with means for realizing the AI function. In FIG. 12, the optimizer 4 includes: positional data acquisition means 27 by means of the GPS that calculates and acquires positional data of the solar module on the basis of a signal received by a GPS antenna 21; and sunrise/sunset time acquisition means 28 that calculates and determines sunrise/sunset time with reference to a direct insolation amount sensor (so-called brightness sensor) 22 and a calendar table 23. In addition, humidity, temperature, atmospheric pressure, and acceleration (vibration) sensors are included.

In addition, there are provided: solar light incident angle acquisition means 29 that calculates and acquires an angle of incidence of solar light on the basis of latitude data of the field stored in the latitude table 24, the calendar table 23, and detection data from the tilt sensor 26; and installation direction/installation angle acquisition means 30 that calculates and acquires installation direction/installation angle of the solar module on the basis of data from the direction sensor (compass) 25 and the detection data from the tilt sensor 26. AI function execution means 31 estimates, determines, and learns environmental data around the solar module such as a duration of shielding by the shielding objects, trend of solar radiation reception amount, and trend of weather condition, from calculation results from the positional data acquisition means 27, the sunrise/sunset time acquisition means 28, the solar light incident angle acquisition means 29, and the installation direction/installation angle acquisition means 30. From the learning result, data is generated for managing the solar cell group and the solar modules, carrying out maintenance, and the like.

Furthermore, output from the AI function execution means 31 is connected to the optimizer 4, and used as a control signal for a solar module detachment switch 5. A clock 34 supplies standard clock data of the power generation site to a microchip 3 mounted with the AI function execution means 31. Note that, an alternative configuration is possible in which determination means (software, for example, RPA: Robotic Process Automation) that follows a procedure defined in advance is provided in place of the AI function execution means 31, and output thereof is supplied to the optimizer 4.

The optimizer 4 includes a monitor 32 that monitors operation of the AI function execution means 31 or the determination means. The monitor 32 for monitoring is provided with correction means 33 that carries out correction when determination by the AI function is, or is suspected to be, non-realistic from the viewpoint of human sense, or when the determination means is determined to be obviously wrong. As a result, the AI is always under the supervision of human, thus enabling shortening of a learning step and improvement of efficiency of learning. The same applies to the determination means. The monitor 32 and the correction means 33 can be installed in the remote terminal 17 shown in FIG. 1(*a*).

Note that the present invention is not limited to the above-described configuration, and it is obvious that various modifications can be made within the scope of the technical spirit of the present invention.

FIG. 13 is a schematic view illustrating an entire image of an example of a monitoring system of the power generation site according to the present invention. Generated power of the solar array 10 installed in the field of the power generation site 35 is output from the power conditioner 14 to the grid line. On the other hand, various data measured by the sensors of the solar array 10, and signals for management and control are transmitted to the server 16 via the in-module parallel connection line, the inter-module parallel connection line, and the relay terminal, and then transferred to the remote terminal 17.

An image of the solar array 10 in the field 35 of the power generation site is captured by the satellite 40, and the image of the solar array 10 is transferred to and stored in the data center 42 via a receiving station. Note that it is obvious that the image of the solar array 10 may also be captured by means such as a drone 43.

The satellite 40, the drone 43 and the like capture, in addition to visible images (still image and video), various images such as a thermo image and spectroscopy data as necessary, and transfers to and stores in the data center 42.

Note that the remote terminal 17 analyzes various types of measured data and management signals from the server 16, and uses image data stored in the data center 42 to identify the module 70 being detached due to degradation in power generation performance. The module 70 thus identified is displayed on a monitor 18 of the remote terminal 17. In this display, warning can be issued by, for example, red colored light/blinking indication on a screen.

On the monitor 18 of the remote terminal 17, the power generation state of each solar module can be displayed on a time axis, or in a format of daily report, monthly report, or the like, as a normal operation status.

FIG. 14 is a schematic view illustrating an example of an image of a monitoring monitor terminal in an example of the monitoring system of the power generation site according to the present invention. In FIG. 14, the monitor 18 is configured to be able to display the solar module identified as described above, and information necessary for running the power generation site such as various types of measured data.

The present Example enables efficient management, from a remote location, of the power generation site under the supervision. Note that transmission of various types of data measured by the sensors, and signals for management and control is not limited to transmission via the PCL line and the communication line, and other wired and wireless transmission means can also be used.

As described in the foregoing, the present Example enables: monitoring of the power generation operation status of the solar power generation system, respective constitutive solar modules thereof, or respective solar cells with a remote value; real-time identification of the failed solar module; simplification of management tasks including maintenance; increase in efficiency of management resource; and the like, leading to a large reduction in the management cost for a large-scale solar power generation site.

| Reference Signs List | |
| --- | --- |
| 1 | Solar cell |
| 2 | Solar cell group |
| 4 | Optimizer |
| 5 | Cell group controller |
| 6 | In-module parallel connection line (module generated power output conveyance communication line) |
| 61 | In-module serial connection line |
| 7 | Solar module |
| 7-1 | One-module set |
| 7-n | n-module set |
| 7-S | Standard module set |
| 8 | Inter-solar-module connection line (generated power output line) |
| 9 | Monitoring/measurement/control signal |
| 10 | Solar array |
| 11 | Sun |
| 12 | Shielding object |
| 13 | Foreign object |
| 14 | Power conditioner |
| 15 | Relay terminal |
| 16 | Server |
| 17 | Remote terminal |
| 18 | Remote monitor |
| 19 | Terminal box |
| 20 | Sensor group |
| 21 | GPS antenna |
| 22 | Direct solar radiation reception amount sensor |
| 23 | Calendar data table |
| 24 | Latitude table |
| 25 | Direction sensor |
| 26 | Tilt sensor |
| 31 | AI |
| 32 | Monitor (monitor of server 16) |
| 33 | Corrected input means |
| 34 | Clock |
| 35 | Field of power generation site |

-continued

| Reference Signs List | |
| --- | --- |
| 36 | Cradle |
| 37 | Network (e.g., Internet) |
| 38 | Shielding object |
| 39 | Junction box |
| 40 | Satellite |
| 44 | Receiving station |
| 42 | Data center |
| 43 | Drone |
| 71 | Frame |

The invention claimed is:

1. A solar power generation site construction method for arranging solar modules in a construction area of a field, comprising:

preparing a plurality of solar cell groups, each comprising a plurality of solar cells and one cell group controller having a connection/disconnection function of each solar cell group and connected to an in-module parallel connection line;

preparing a plurality of solar modules, one solar module including a plurality of the solar cell groups and one optimizer;

preparing a plurality of reference module sets, each comprising a plurality (N) of the solar modules connected through the in-module parallel connection line, serving as a construction standard, and a plurality of n-module sets, each comprising an arbitrary number between 2 and N−1, of the solar modules connected through another in-module parallel connection line, each of the reference module sets and the n-module sets being connected to an inter-module parallel connection line through each of the optimizers; and arranging a plurality of the reference module sets, a plurality of the n-module sets, and a plurality of the solar modules in the construction area according to a shape thereof, wherein each of the cell group controllers monitors a power generation state of each of the solar cell groups, and when it is detected that a power generation amount in one solar cell group is lower than a predetermined threshold value, the cell group controller disconnects the one solar cell group from the in-module parallel connection line, and then when the power generation amount in the one solar cell group exceeds the threshold value, the one solar cell group is connected to the in-module parallel connection line, and each of the optimizers disconnects each of the solar modules from the inter-module parallel connection line when an overall power generation amount of one solar module is detected to be no greater than a threshold value, and each of the optimizers disconnected is connected to the inter-module parallel connection line when the overall power generation amount of the solar module disconnected is detected to be greater than the threshold value.

2. The solar power generation site construction method according to claim 1, wherein the reference module sets are laid in a principal region in a central portion of the construction area with a two-dimensional shape; and the solar cell groups and the n-module sets are laid in an empty space between an inner edge of the construction area and an outer edge of the reference module set in the construction area.

3. The solar power generation site construction method according to claim 2, wherein an installation angle of each of the solar cells installed in the construction area with the two-dimensional shape with respect to a horizontal plane is randomly set.

4. The solar power generation site construction method according to claim 3, wherein the installation angle of each of the solar cells in the solar cell groups, the reference module set and/or the n-module set is randomly set.

5. The solar power generation site construction method according to claim 3, wherein the installation angle of each of the solar cells in the reference module set and the n-module set installed in the construction area with the two-dimensional shape with respect to the horizontal plane is randomly set.

6. The solar power generation site construction method according to claim 3, wherein the installation angle of the solar cells with respect to the horizontal plane is any one of a tilt angle of a reference plane oriented in a solar light radiation direction and a tilt angle of an arbitrary plane tilted with respect to the reference plane.

7. The solar power generation site construction method according to claim 1, wherein the reference module sets are laid in the construction area with a two-dimensional shape for a number the reference module sets can be laid; and the n-module sets and the solar cell groups are laid in an empty space between an inner edge of the construction area and an outer edge of the reference module set in the construction area.

8. The solar power generation side construction method according to claim 1, further comprising: arranging further a junction box having a power/data separator connected to the optimizers through the inter-solar-module connection line;

a power conditioner connected to the power/data separator and outputting power from the power/data separator to a grid line;

a relay terminal connected to the power/data separator and collecting data of the cell group controllers separated at the power/data separator to accumulate data of the optimizers;

a remote terminal installed at an integrated management site at a remote site; and a server that includes a communication control device and carries out an upload/download process of management/control data via a public telecommunication network between the relay terminal and the remote terminal.

\* \* \* \* \*